United States Patent [19]
Wiker et al.

[11] Patent Number: 5,893,688
[45] Date of Patent: Apr. 13, 1999

[54] MASONRY DRILL BIT

[75] Inventors: Juergen Wiker, Leinfeldon-Echterdingen, Germany; Benjamin T. Harris; David H. Byrley, both of Louisville, Ky.

[73] Assignee: Credo Tool Company, Woodburn, Oreg.

[21] Appl. No.: 08/907,028

[22] Filed: Aug. 6, 1997

Related U.S. Application Data

[60] Provisional application No. 60/023,733, Aug. 8, 1996.

[51] Int. Cl.$^6$ ............................................. B23B 51/02
[52] U.S. Cl. .......................... 408/230; 175/394; 175/420.1; 408/228
[58] Field of Search ........................... 408/223, 224, 408/225, 227, 228, 230; 175/394, 395, 420.1

[56] References Cited

U.S. PATENT DOCUMENTS

| | | | |
|---|---|---|---|
| 3,447,616 | 6/1969 | Granat | 175/394 |
| 3,469,643 | 9/1969 | Ter Horst | 175/394 |
| 4,314,616 | 2/1982 | Rauckhorst et al. | 174/394 |
| 4,984,944 | 1/1991 | Pennington, Jr. et al. | 408/223 |
| 5,746,095 | 5/1998 | Sohnlein | 408/230 |

FOREIGN PATENT DOCUMENTS

| 330 580 | 6/1958 | Switzerland | 408/223 |
|---|---|---|---|

*Primary Examiner*—Daniel W. Howell
*Attorney, Agent, or Firm*—McDermott, Will & Emery

[57] ABSTRACT

A masonry drill bit having an improved insert geometry, insert orientation, and interface clearance for providing improved drill speed and penetration rate. The drill bit is adapted for use in drilling masonry or other hard, brittle material. The drill bit has an axially elongated body with a leading front end portion and a rear end portion. The rear end portion is adapted to be held by a tool holder. The body has at least one spiral groove cast in its exterior surface substantially along its length. The insert is embedded in the leading end of the body, extending generally diametrically across the leading end of the body, and centered about a latitudinal plane of the insert. The geometric design of the insert, the orientation of the insert relative to the drill bit, and the interface clearance between the insert and the grooves, reduces friction and heat; resists wear, fractures, and abrasive actions of the chips; increases design life of the elements; and enhances debris elimination.

18 Claims, 11 Drawing Sheets

MASONRY DRILL BIT

This application is based on Provisional Application Ser. No. 60/023,733, having a filing date of Aug. 8, 1996.

BACKGROUND OF THE INVENTION

The present invention relates to the design of masonry drill bits which are especially adapted for drilling masonry, stone, rock, concrete, cement, cinder block, and the like. In particular, the masonry drill bits have an improved insert geometry, insert orientation, and interface clearance for providing improved drill speed and penetration rate.

Masonry drill bits have been known and are commonly used for drilling holes in especially hard friable material such as masonry or stone. These drill bits are usually comprised of an elongated body or shank having a spiral groove or grooves formed along their length and having a diametrically extending straight groove on their leading end. A hard insert was provided in the straight groove and was held in place by soldering or brazing. The insert usually had sharp cutting edges on its leading end so that the drill bit might effectively be used in the hard masonry or stone material. The spiral groove provides a channel for the discharge of chips, particles, dust and other drilling debris loosened by the leading end of the drill bit during the drilling operation. The insert must be capable of resisting wear, fracture, and the abrasive action of the chips from the material being drilled, while the body of the drill bit must maintain sufficient strength in the presence of heat generated in use.

In the manufacture of prior art masonry drills, it has been the practice to make the drill bit body of a material such as steel and to mount the abrasion-resistant insert or cutting elements at the cutting end. The body of the drill bit was normally formed by conventional rolling, machining or grinding of the spiral thread in a blank or rod of suitable length. The straight groove for the mounting of the insert or cutting element was then machined in the leading end of the drill bit body, and the cutting element was placed and secured. The cutting element was formed of a hard material such as tungsten carbide and was usually anchored in place in the body of the drill bit by soldering or brazing it in. Examples of prior art masonry drill bits are shown in the following U.S. Pat. Nos.: 4,314,616 issued to Rauckhorst et al.; 4,527,638 issued to Sanchez et al.; 4,579,180 issued to Peetz et al.; 4,605,347 issued to Jodock et al.; 4,984,944 issued to Pennington, Jr. et al.; 5,184,689 issued to Sheirer et al.; and 5,630,478 issued to Schimke.

Figure 7:
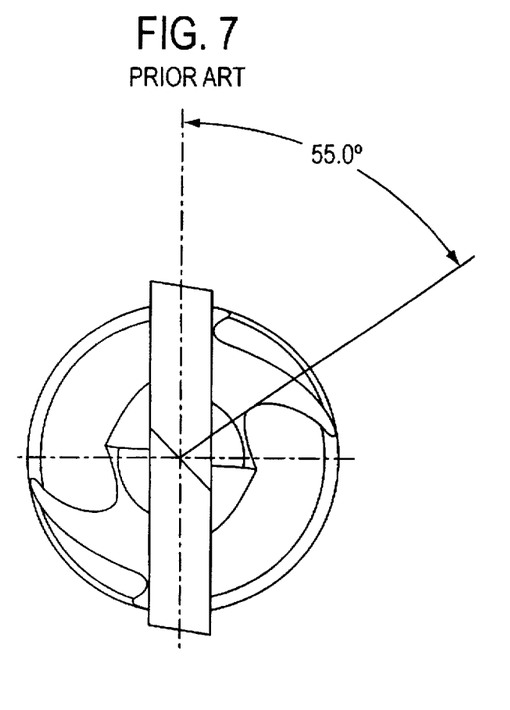
FIG. 7 is a detailed top view of the leading end of conventional drill bit with a conventional orientation angle.
Figure 8:
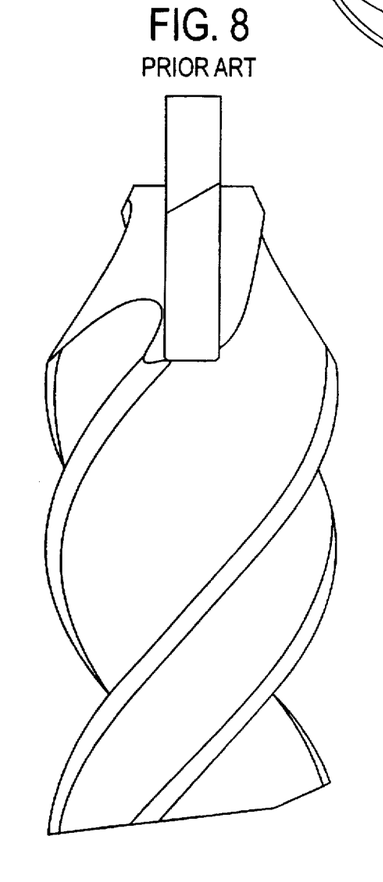
FIG. 8 is an elevational view of the leading end of a conventional drill bit illustrated in FIG. 7.

FIGS. 7 and 8 illustrate a typical drill bit having an insert with improper orientation. The insert in the typical drill bit is oriented whereby its orientation angle is greater than the present invention. As a result, the debris removal during drilling is hindered, causing the drill speed and penetration rate to be decreased.

Figure 9:
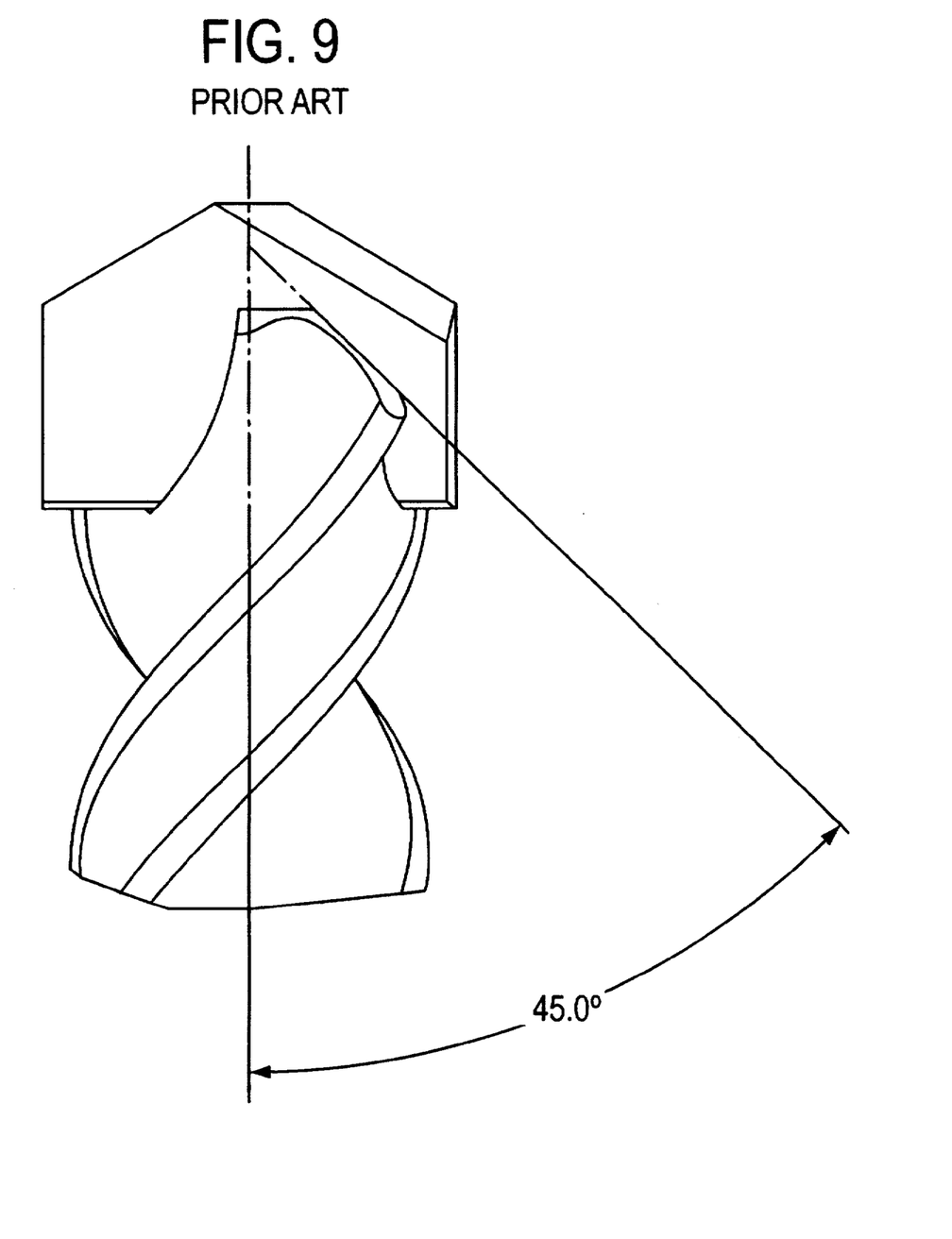
FIG. 9 is an elevational view of the leading end of a conventional drill bit with a conventional interface angle.

FIG. 9 illustrates a typical drill bit having inadequate interface clearance. The grooves of the drill are aligned having reduced interface clearance which hinders the debris from entering the grooves for its elimination. As a result, the drill speed and penetration rate is decreased.

None of the patents described above provides the present invention's important advantages associated with a drill bit having improved insert geometry, insert orientation, and interface clearance. Some of the advantages are reducing friction and heat; resisting wear, fractures, and abrasive action of the chips; increasing design life of the elements; and removing debris. As a result, the present invention's drill bit rotary speed and penetration rate is increased.

SUMMARY OF THE INVENTION

The present invention relates to the design of masonry drills bits having an improved insert geometry, insert orientation, and interface clearance for providing improved drill speed and penetration rate. The drill bits are adapted for use in drilling masonry or other hard, brittle material, which comprises an axially elongated, generally cylindrical body aligned on a longitudinal axis, with a leading front end portion and a rear end portion. The rear end portion is adapted to be held by a tool holder. The body has at least one spiral groove cast in its exterior surface substantially along its length. The insert is embedded in the leading end of the body, extending generally diametrically across the leading end of the body, and centered about a latitudinal plane of the insert.

As pointed out in greater detail below, the geometric design of the insert, the orientation of the insert relative to the drill bit, and the interface clearance between the insert and the grooves, reduces friction and heat; resists wear, fractures, and abrasive actions of the chips; increases design life of the elements; and enhances debris elimination.

Figure 3:
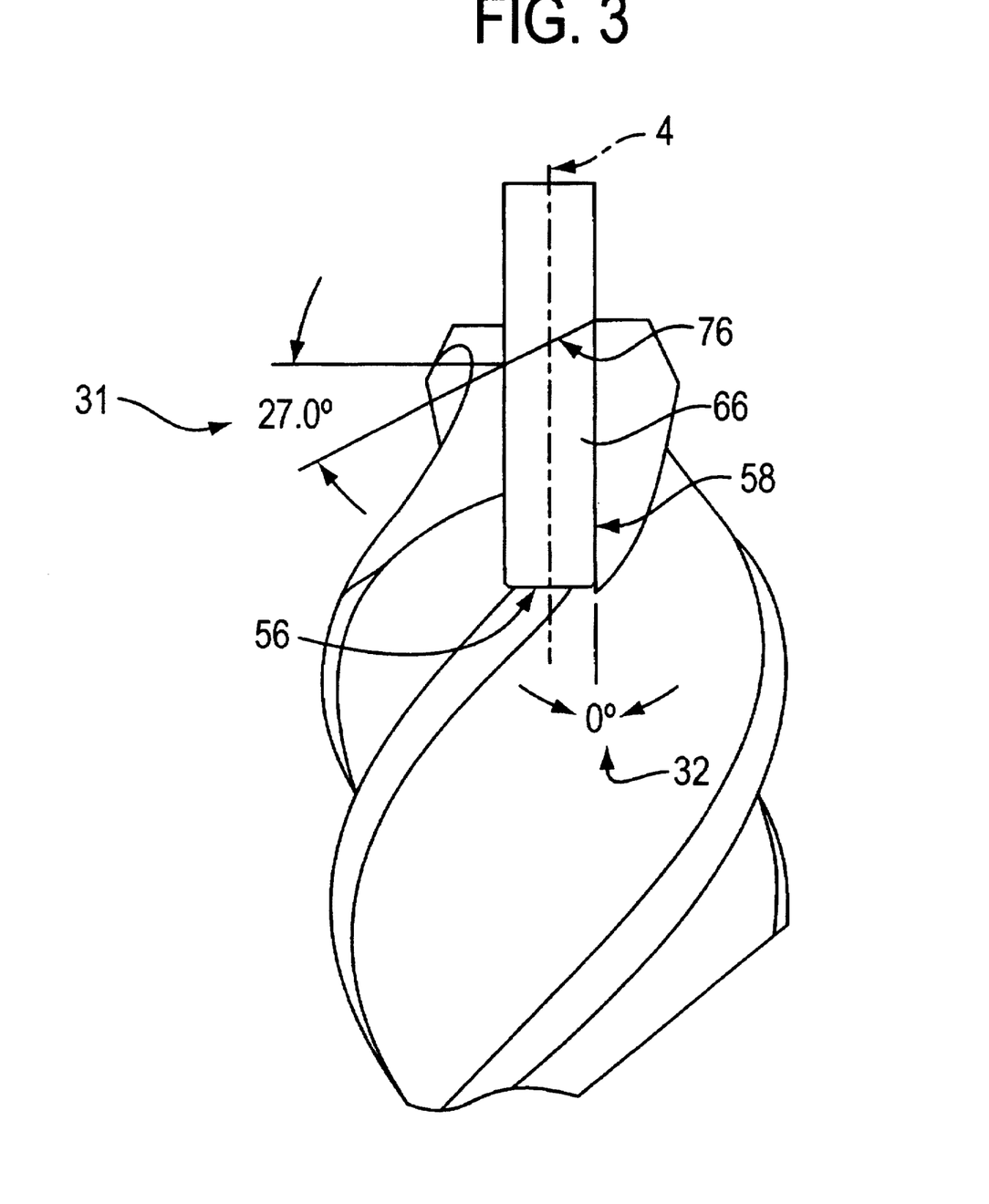
FIG. 3 is a detailed view of the leading end of drill bit illustrated in FIG. 2, wherein the backangle and face angle is included.

The present invention has the advantage of an improved insert geometry such that the end edge has a backangle shown in FIG. 3, from about 26° to about 28° preferably, most preferably about 27°, between a plane parallel with the end edge and a plane parallel with the bottom surface.

Furthermore, the improved geometry of the insert is accomplished by the leading face, also shown in FIG. 3, having a faceangle from about 0° to about 2° preferably, most preferably about 0°, between a plane parallel with the leading face and the longitudinal axis.

Figure 4:
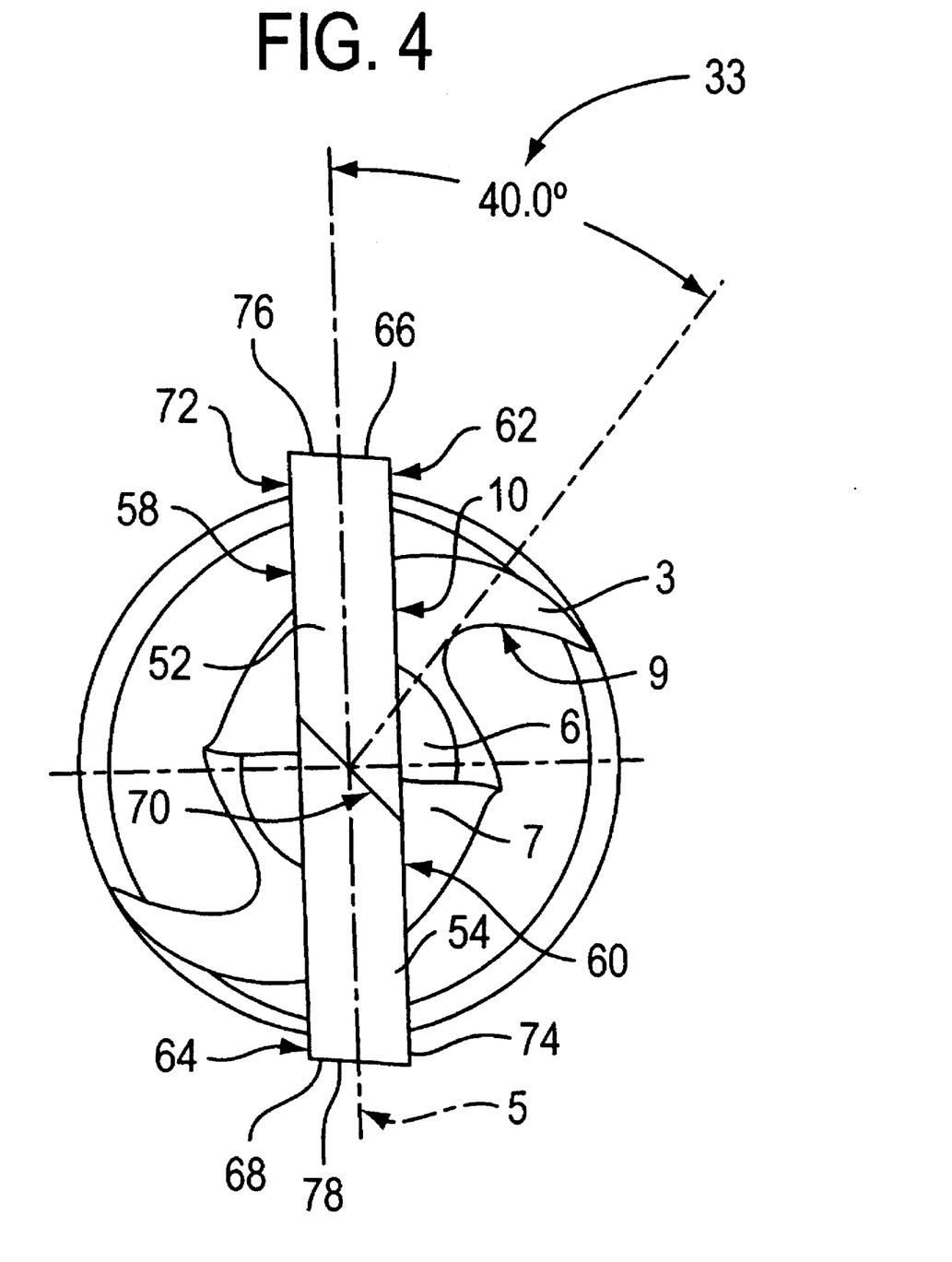
FIG. 4 is a detailed top view of the leading end of drill bit illustrated in FIG. 3, wherein the orientation angle is included.

In addition, the present invention has the advantage of an improved insert orientation such that the insert has an orientation angle shown in FIG. 4, from about 35° to about 45° preferably, most preferably about 40°, between a plane—extending from the apex of the convex line of the wide groove to an intersection point of the latitudinal plane and the center of the chisel edge—and the latitudinal plane.

Figure 5:
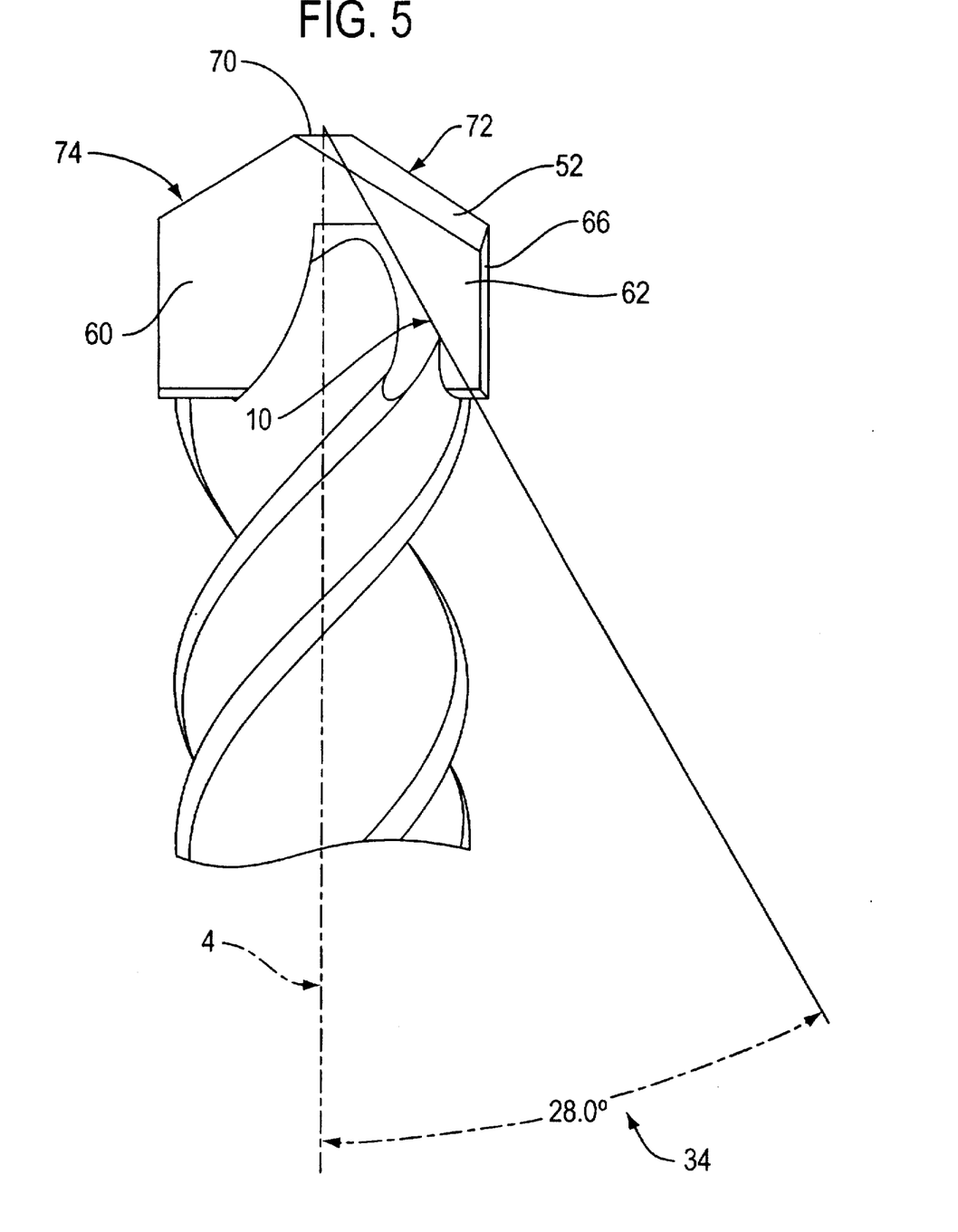
FIG. 5 is a detailed view of the leading end of drill bit illustrated in FIG. 1, wherein the interface angle is included.
Figure 6:
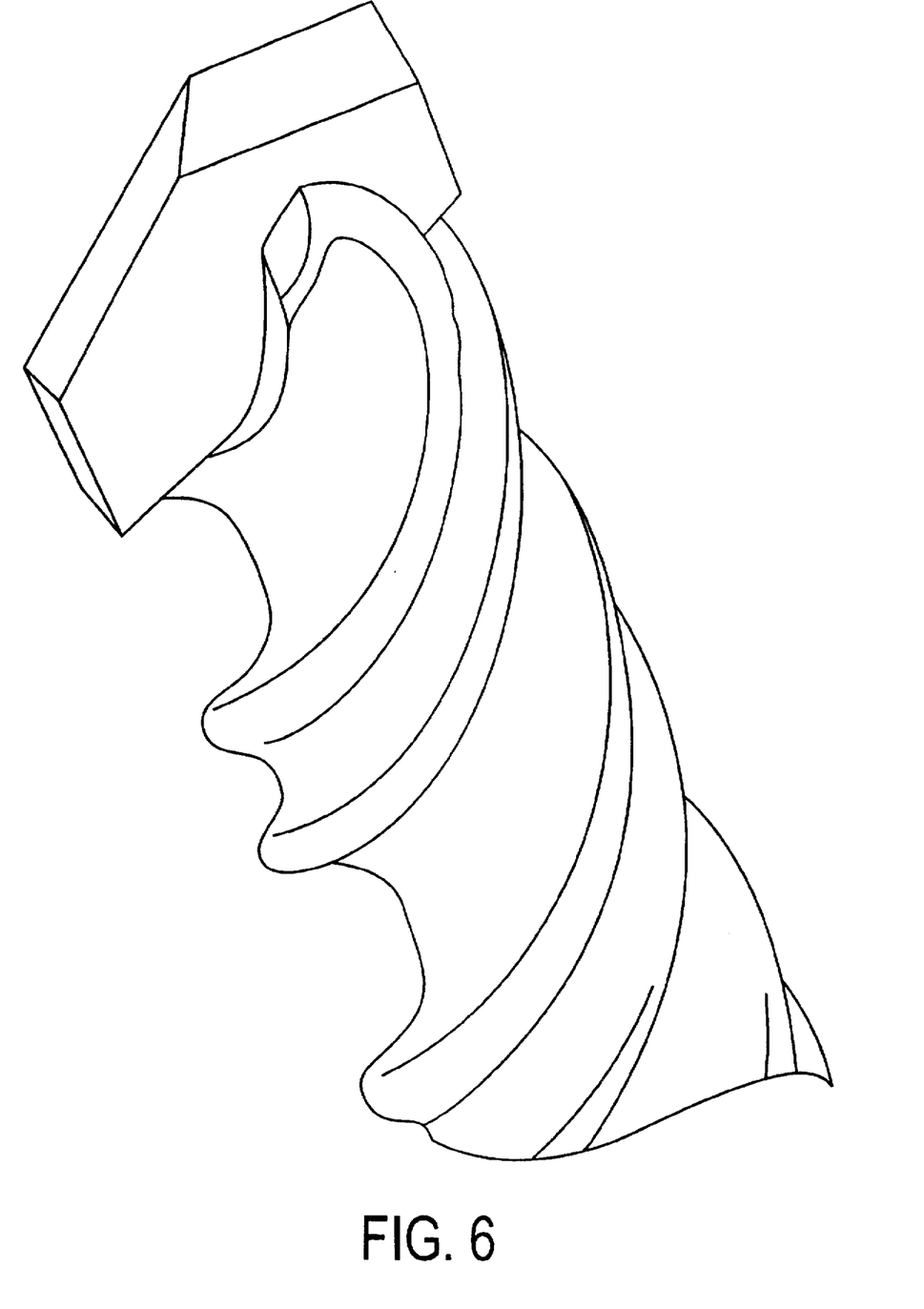
FIG. 6 is a perspective view of the drill bit of the present invention.

Finally, the present invention has the advantage of an improved interface clearance such that the wide groove terminates at the insert at the adjoining surface shown in FIG. 5 with an interface angle from about 26° to about 36° preferably, most preferably about 28°, between the plane of the adjoining surface and the longitudinal axis.

The invention itself; together with further objects and attendant advantages, will best be understood by reference to the following detailed description taken in conjunction with the accompanying drawings.

DETAILED DESCRIPTION OF THE INVENTION

Figure 1:
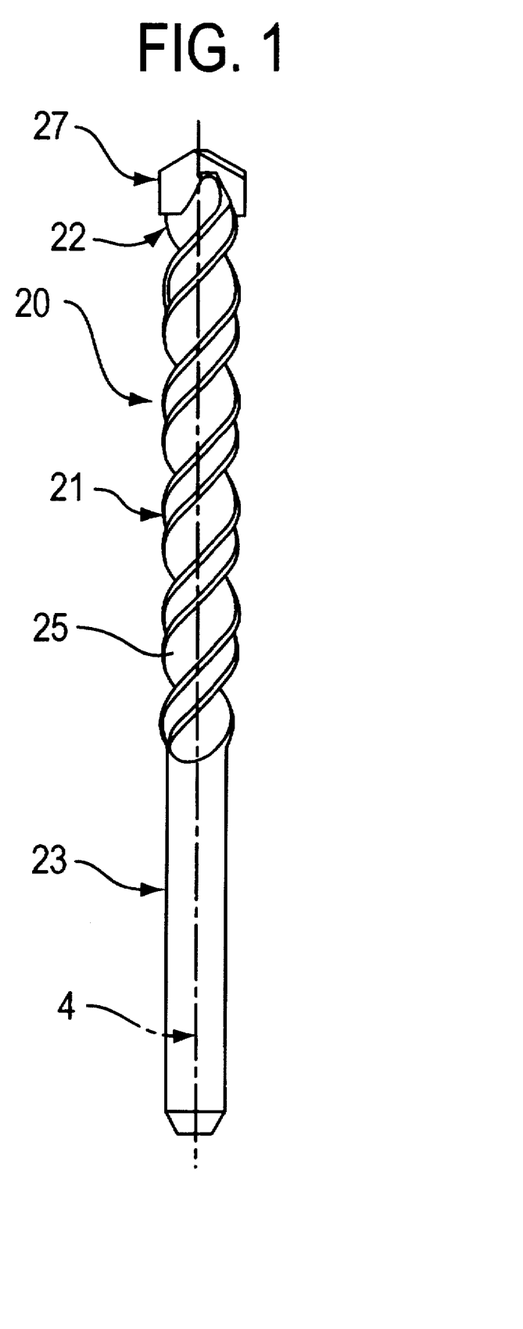
FIG. 1 is an elevational view of the drill bit of the present invention.
Figure 2:
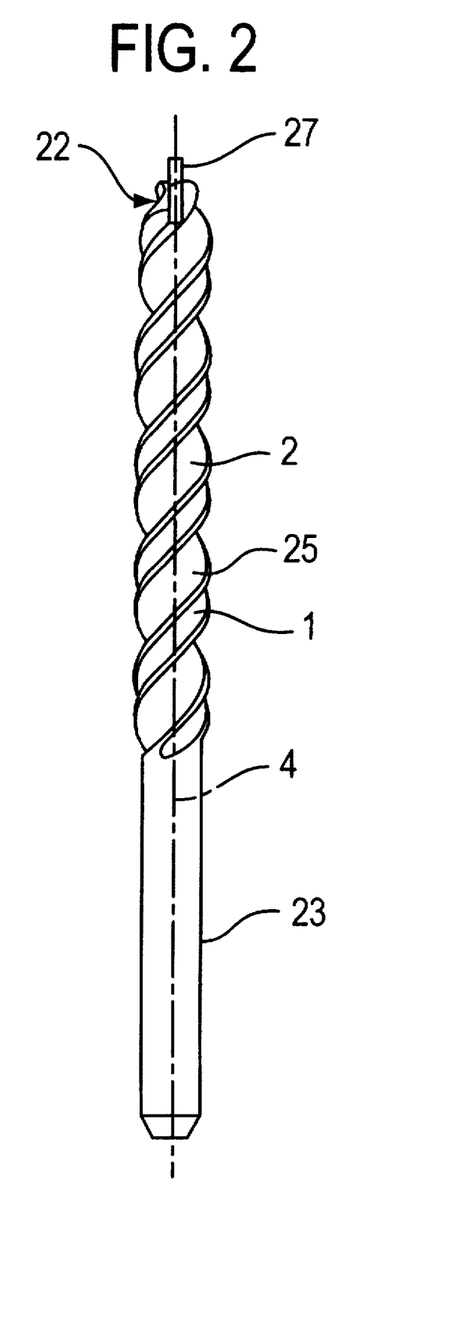
FIG. 2 is an elevational view of the drill bit of the present invention, a quarter turn from the position of FIG. 1.

Referring more particularly to the drawings, and initially to FIGS. 1–2, there is shown the masonry drill bit 20 of the present invention. The drill bit 20 comprises an axially elongated, generally cylindrical body 21 having at its leading or front end a tip 22 which drill into the masonry or other material. The body 21 may be of any suitable length aligned on a longitudinal axis 4 and preferably substantially in excess of the deepest hole to be drilled. The body 21 also has a diameter slightly smaller than that of the hole to be drilled. At the rear end portion there is formed a cylindrical elongated shank 23 which is adapted to be releasably clamped in the chucking device of a suitable driving unit, such as a motor driven drill. The shank 23 may be generally cylindrical with a smooth outer surface.

The body is formed with threads defining a pair of spiral or helical discharge channels or flutes or grooves 25. Although a single groove may be used, two pairs of grooves 25 are preferred with each pair containing a narrow groove 1 and a wide groove 2. The spiral grooves 25 are formed in the drill bit body 21 along its entire length from the tip 22 to the shank 23. In accordance with known principles of drill design, the grooves 25 provide a means for the discharge of drilling debris during the use of the drill. The spiral grooves 25 are of sufficient width and depth to be capable of conveying chips, particles and dust dislodged by the cutting means at the drill tip 22 and operate to advance the chips, particles and dust toward the shank 23 as the drill bit 21 is rotated.

A hard insert 27 is embedded in the body 21 at the tip 22. The insert 27 is arranged to extend diametrically across the end of the drill bit 21 aligned with a latitudinal axis 5 (shown in FIG. 4) and provides a hard cutting means for forming a hole in the material to be drilled. The insert 27 is preferably slightly wider than the greatest diameter of the cylindrical drill body 21 so that the insert 27 cuts a hole slightly larger than that needed to accommodate the drill body 21. As previously discussed, the body 21 of the drill bit 20 is preferably formed with two pairs of grooves 25, each pair ending on opposite sides of the insert 27 to provide an escape path for drilling chips, particles, dust, and other debris loosened by the insert 27 during the drilling operation.

As shown in FIGS. 3–6, the insert 27 includes a first and second top surface 52 and 54, a bottom surface 56, a first and second leading face 58 and 60, a first and second trailing face 62 and 64, and a first and second end surface 66 and 68.

A chisel edge 70 is formed between the intersection of the first top surface 52 and the second top surface 54. A first and second cutting edge 72 and 74 are defined by the intersection of the first top surface 52 and the first leading face 58 and by the intersection of the second top surface 54 and the second leading face 60, respectively. The second leading face 60 and the first trailing face 62 are essentially planar surfaces aligned adjacently in a common plane. The first leading face 58 and the second trailing face 64 are essentially planar surfaces aligned adjacently in a common plane. A first and second end edge 76 and 78 are defined by the intersection of the first top surface 52 and the first end surface 66 and by the intersection of the second top surface 54 and the second end surface 68, respectively.

As shown in FIGS. 3–6, the leading end of each of the grooves 25 terminate adjacent to the first and second trailing face 62 and 64 of the insert 27 to enable the cuttings from the material being drilled to freely flow through the grooves 25 and exit at the rear end portion of the body 21.

A transition surface 3, an inner facet 6, and a web 7 connects each of the wide grooves 2 to the first and second trailing face 62 and 64. The surface of contact between the wide groove 2 and the transition surface 3 is curvilinear forming essentially a convex shaped line 9. The surface of contact between the transition surface 3 and the insert 27 is an essentially linear adjoining surface 10.

As shown in FIGS. 3–6, the first end surface 66 is parallel with the second end surface 68, and each of the first end surface 66 and second end surface 68 forms an acute angle to the first and second leading face 58 and 60, respectively.

Tests were performed to determine optimum insert geometry, using Taguchis Design of Experiment Method ("DOE"). The DOE method is a computerized method to determine how different design parameters and their combinations affect the speed of the drill bit, without actually testing all of the various possible combinations.

The DOE method was carried out for three different parameters, backangle, faceangle and flutestyle. It was determined that backangle and faceangle have a significant effect on the performance of the drill bit, while flutestyle has no significant effect on the performance of the drill bit.

The present invention has the advantage of an improved insert geometry such that the first end edge 76 has a backangle 31 shown in FIG. 3, from about 26° to about 28° preferably, most preferably about 27°, between a plane parallel with the first end edge 76 and a plane parallel with the bottom surface 56. The second end edge 78 also has a backangle 31 from about 26° to about 28° preferably, most preferably about 27°, between a plane parallel with the second end edge 78 and a plane parallel with the bottom surface 56.

Furthermore, the improved geometry of the insert is accomplished by the first leading face 58 having a faceangle 32 from about 0° to about 2° preferably, most preferably about 0°, between a plane parallel with the first leading face 58 and the longitudinal axis 4. The second leading face 60 also has a faceangle 32 from about 0° to about 2° preferably, most preferably about 0°, between a plane parallel with the second leading face 60 and the longitudinal axis 4.

Figure 10:
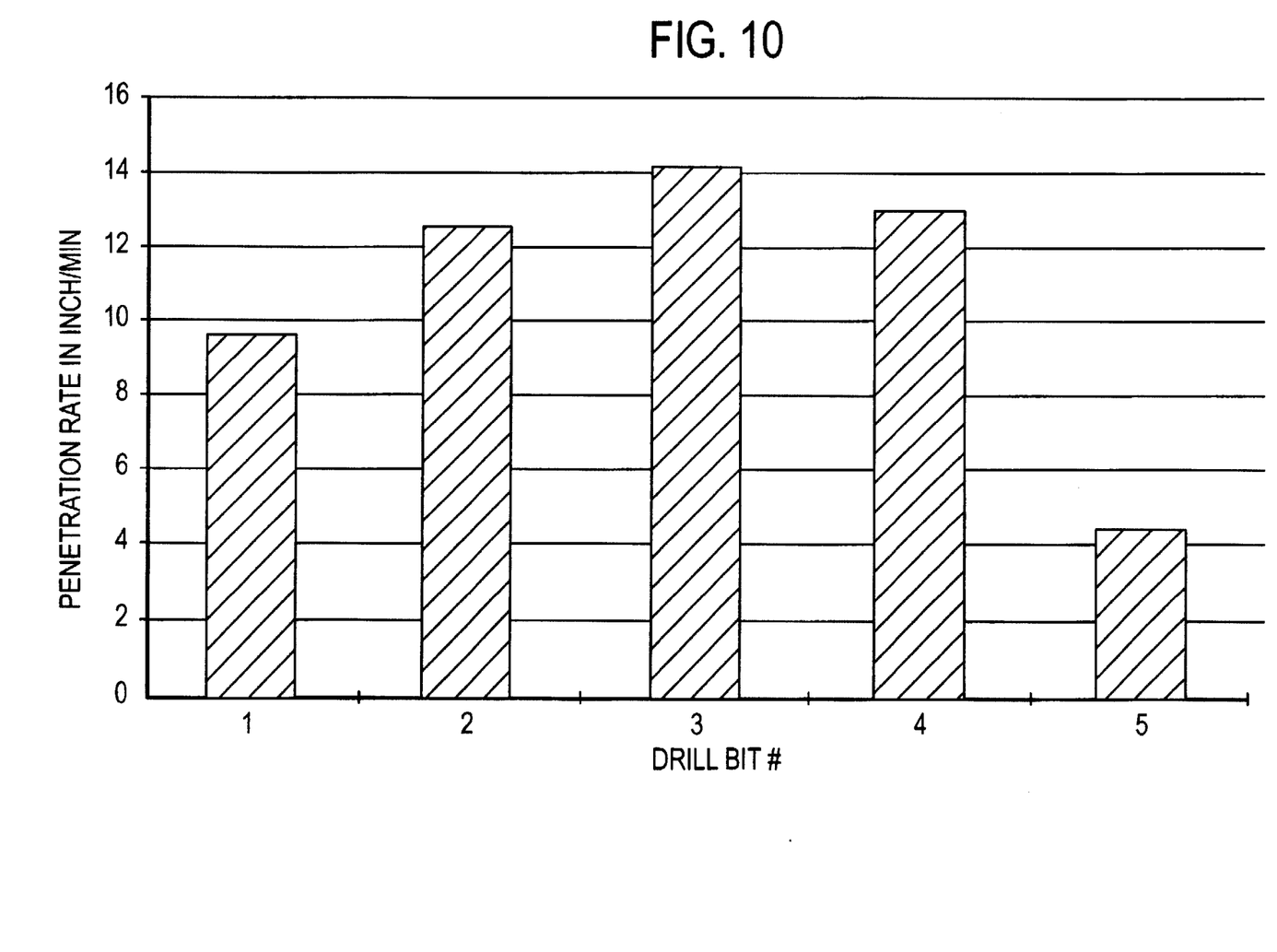
FIG. 10 is a bar graph showing the drill bit penetration rate, in the percussion drilling mode, versus the insert orientation angle.
Figure 11:
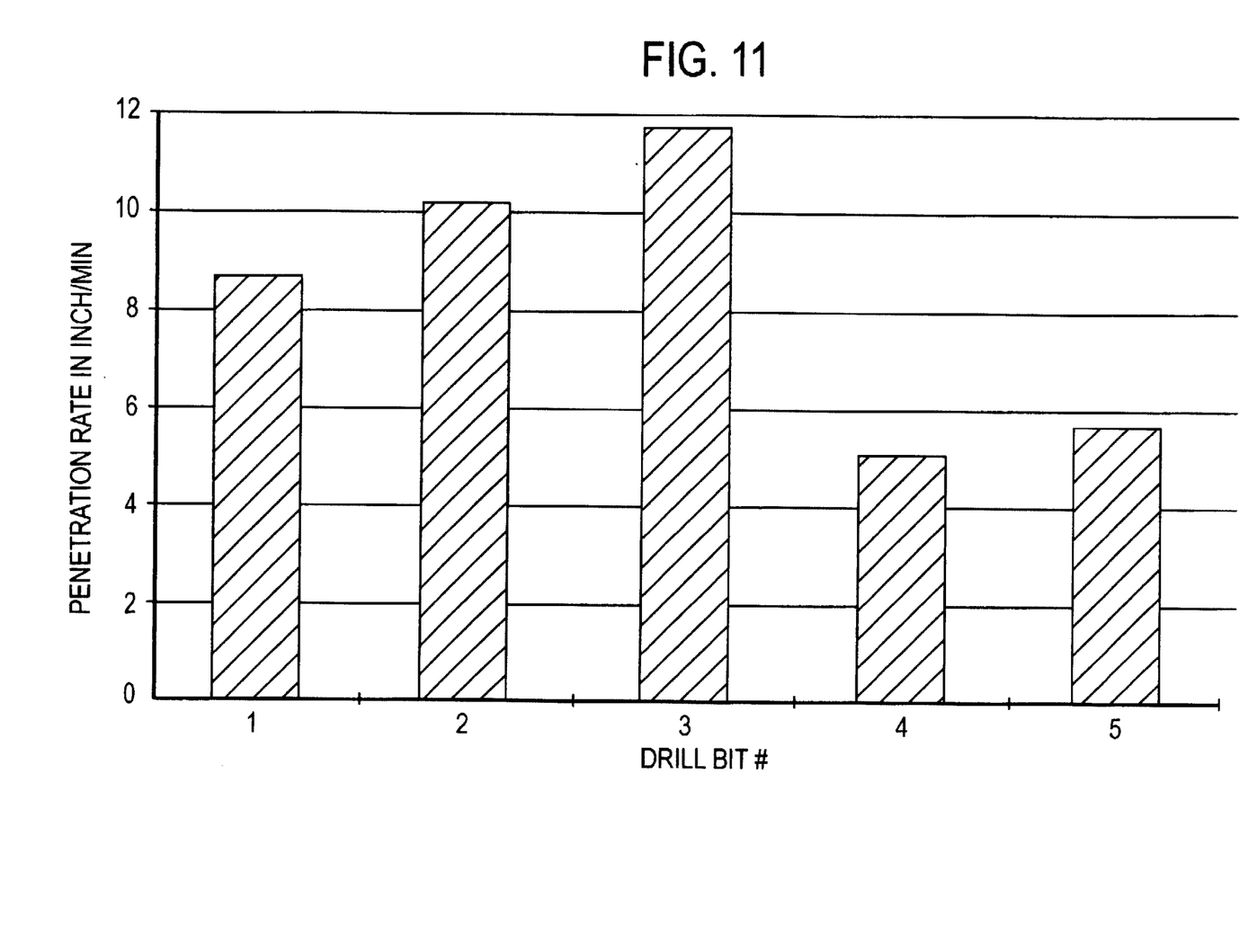
FIG. 11 is a bar graph showing the drill bit penetration rate, in the rotary drilling mode, versus the insert orientation angle.

Tests were also conducted to determine the effect which the orientation of the insert would have on the speed of the drill bit. FIGS. 10 and 11 are bar graphs illustrating the relationship between insert orientation and the penetration rate of the drill bit.

In particular, FIG. 10 illustrates the test results obtained from testing five drill bits in a percussion drilling mode.

Drill bits Nos. 1–4, having the highest penetration rate, were all oriented within the specified 35° to 45° orientation angle range of the present invention. By contrast, Drill bit No. 5 had an unfavorable penetration rate as it was improperly orientated.

Similarly, FIG. 11 illustrates the test results obtained from testing five drill bits in a rotary drilling mode. Drill bits Nos. 1–3, having the highest penetration rate, were all oriented within the specified 35° to 45° orientation angle range of the present invention. By contrast, Drill bit Nos. 4–5 had an unfavorable penetration rate as they were improperly orientated.

The present invention has the advantage of an improved insert orientation such that the insert 27 has an orientation angle 33 shown in FIG. 4, from about 35° to about 45° preferably, most preferably about 40°, between a plane—extending from the apex of the convex line 9 to an intersection point of the longitudinal axis 4 and the chisel edge 70—and the latitudinal plane 5.

Figure 12:
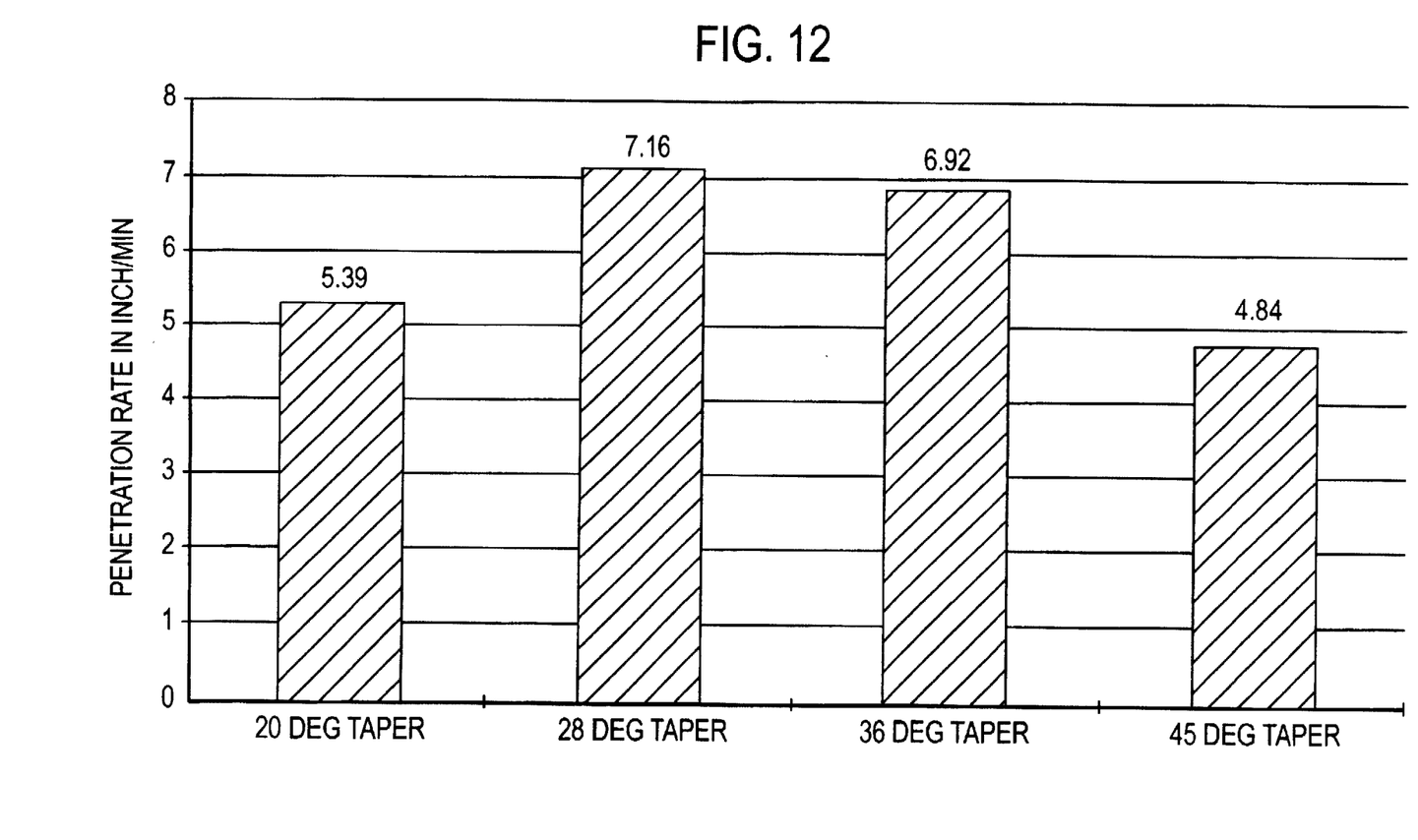
FIG. 12 is a bar graph showing the drill bit penetration rate, in the rotary drilling mode, versus the interface angle.
Figure 13:
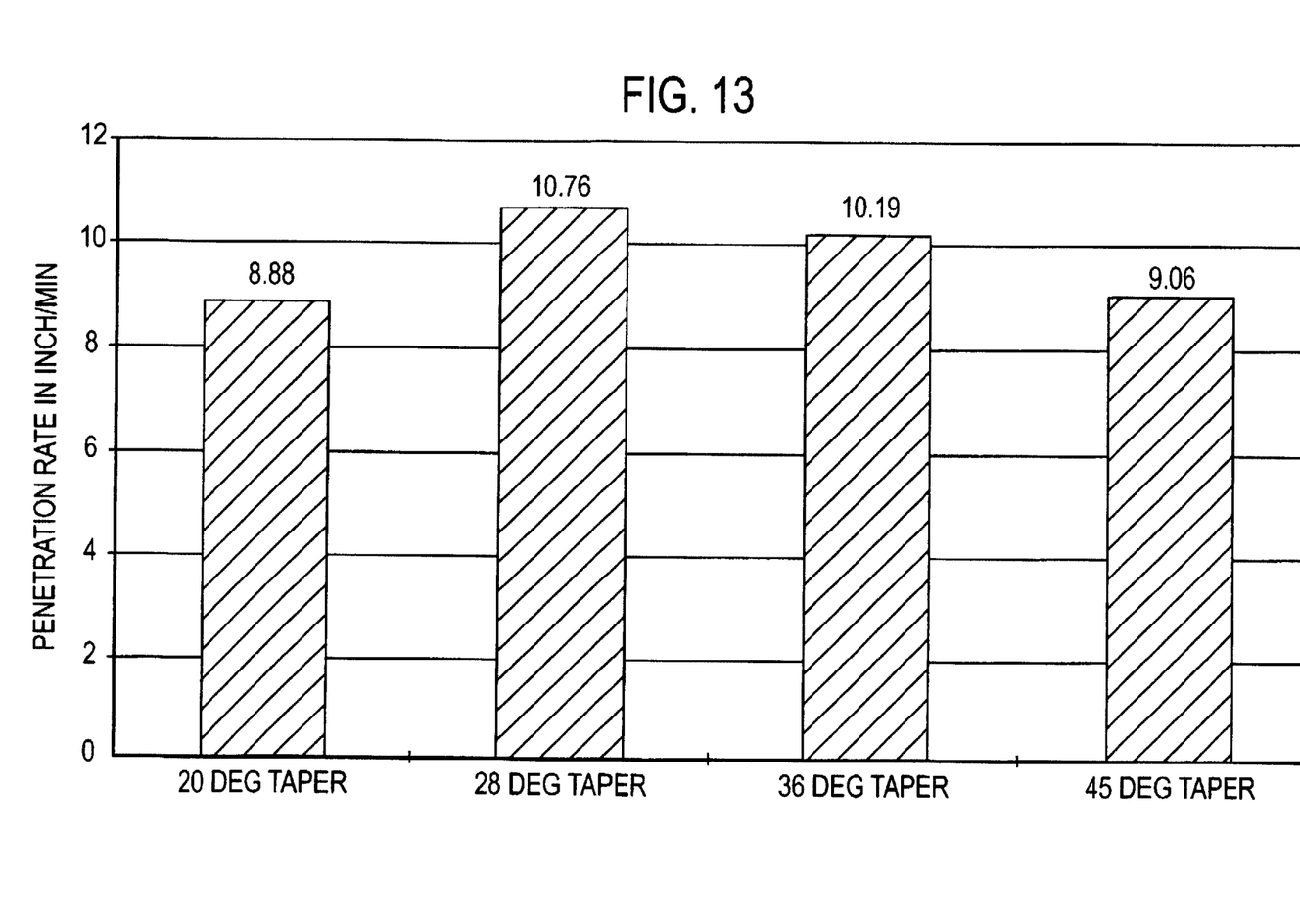
FIG. 13 is a bar graph showing the drill bit penetration rate, in the percussion drilling mode, versus the interface angle.

Furthermore, tests were conducted to determine whether interface clearance of the insert and grooves has an effect on the speed of the drill bit. FIGS. 12 and 13 are bar graphs illustrating the relationship between interface clearance (taper of the interface angle) and the penetration rate of the drill bit.

FIG. 12 illustrates the test results of five drill bits tested in rotary drilling mode. The drill bit with the 28° interface angle of the present invention had the greatest penetration rate. Meanwhile, unfavorable results were realized with drill bits having interface angles marginally different than the 28° interface angle of the present invention.

Similarly, FIG. 13 illustrates the test results of five drill bits tested in the percussion drilling mode. As discussed above, the drill bit with the 28° interface angle of the present invention realized the greatest performance.

The present invention has the advantage of an improved interface clearance such that the wide groove 2 terminates at the insert 27 at the adjoining surface 10 shown in FIG. 5 with an interface angle 34 from about 26° to about 36° preferably, most preferably about 28°, between the plane of the adjoining surface 10 and the longitudinal axis 4.

Of course, it should be understood, that a wide range of changes and modifications can be made to the preferred embodiments described above. It is therefore intended that the foregoing detailed description be regarded as illustrative rather than limiting and that it is to be understood that it is the following claims, including all equivalents, which are intended to define the scope of the invention.

What is claimed is:

1. A drill bit (20) adapted for use in drilling masonry or other hard, brittle material, which comprises:

an axially elongated, generally cylindrical body (21), aligned on a longitudinal axis (4), having a leading front end portion and a rear end portion, said rear end portion adapted to be held by a tool holder, said body having at least one spiral groove (25) cast in its exterior surface substantially along its length; and a hard insert (27) embedded in the leading end of said body, extending generally diametrically across said leading end of said body, centered about a latitudinal plane (5) said insert comprising:

a first top surface (52), a second top surface (54), a bottom surface (56) opposite said first and second top surface, a first leading face (58) extending between forwardly facing edges of said first top surface and said bottom surface, a second leading face (60) extending between forwardly facing edges of said second top surface and said bottom surface, a first trailing face (62) opposite said first leading face and extending between rearwardly facing edges of said first top surface and said bottom surface, a second trailing face (64) opposite said second leading face and extending between rearwardly facing edges of said second top surface and said bottom surface, a first end surface (66) extending between outwardly facing edges of said first top surface, bottom surface, first leading face and first trailing face, a second end surface (68) extending between outwardly facing edges of said second top surface, bottom surface, second leading face and second trailing face;

a first end edge (76) defined by the intersection of said first top surface and the first end surface and a second end edge (78) defined by the intersection of the second top surface and said second end surface;

wherein a chisel edge (70) defined by the intersection of said first top surface and said second top surface;

a first cutting edge (72) defined by the intersection of said first top surface and said first leading face and a second cutting edge (74) defined by the intersection of said second top surface and said second leading face, wherein said second leading face and said first trailing face are essentially planar surfaces aligned adjacently in a common plane, said first leading face and said second trailing face are essentially planar surfaces aligned adjacently in a common plane, said first end surface is parallel with said second end surface, and each of said first end surface and second end surface forms an acute angle relative to the first and second leading face, respectively;

wherein said drill bit has two pairs of said grooves, each said pair adjoining to said trailing face of said insert to provide an escape path for drilling chips, particles, dust, and other debris loosened by said insert during the drilling operation, wherein said each pair comprises at least one narrow groove (1) and at least one wide groove (2); and wherein a transition surface (3), an inner facet (6), and a web (7) connects each of said wide grooves to said trailing face, and the surface of contact between said wide groove and said transition surface is curvilinear forming essentially a convex line (9), and the surface of contact between said transition surface and said insert is essentially a linear shaped adjoining surface (10).

2. A drill bit (20) adapted for use in drilling masonry or other hard, brittle material, which comprises:

an axially elongated generally cylindrical body (21), aligned on a longitudinal axis (4), having a leading front end portion and a rear end portion, said rear end portion adapted to be held a tool holder, said body having at least one spiral groove (25) cast in its exterior surface substantially along its length; and a hard insert (27) embedded in the leading end of said body, extending generally diametrically across said leading end of said body, centered about a latitudinal plane (5) said insert comprising:

a first ton surface (52), a second ton surface (54), a bottom surface (56) opposite said first and second ton surface, a first leading face (58) extending between forwardly facing edges of said first top surface and said bottom surface, a second leading face (60) extending between forwardly facing edges of said second top surface and said bottom surface, a first trailing face (62) opposite said first leading face and extending between rearwardly facing edges of said first top surface and said bottom surface, a second trailing face (64) opposite said second leading face and extending between rearwardly facing edges of said second top surface and said bottom surface, a first end surface (66) extending between outwardly facing edges of said first top surface, bottom surface, first leading face and first trailing face, a second end surface (68) extending between outwardly facing edges of said second top surface, bottom surface, second leading face and second trailing face;

a first end edge (76) defined by the intersection of said first top surface and the first end surface and a second end edge (78) defined by the intersection of the second top surface and said second end surface; and wherein said first leading face has a faceangle (32) about 0° to about 2° from said longitudinal axis, and said second leading face has a faceangle about 0° to about 2° from said longitudinal axis, said first end edge has a backangle (31) about 26° to about 28° from a plane parallel to said bottom surface and said second end edge has a backangle about 26° to about 28° from a plane parallel to said bottom surface.

3. A drill (20) adapted for use in drilling masonry or other hard, brittle material, which comprises:

an axially elongated, generally cylindrical body (21), aligned on a longitudinal axis (4), having a leading front end portion and a rear end portion, said rear end portion adapted to be held by a tool holder, said body having at least one spiral groove (25) cast in its exterior surface substantially along its length; and a hard insert (27) embedded in the leading end of said body, extending generally diametrically across said leading end of said body, centered about a latitudinal plane (5) said insert comprising:

a first top surface (52), a second top surface (54), a bottom surface (56) opposite said first and second top surface, a first leading face (58) extending between forwardly facing edges of said first top surface and said bottom surface, a second leading face (60) extending between forwardly facing edges of said second top surface and said bottom surface, a first trailing face (62) opposite said first leading face and extending between rearwardly facing edges of said first top surface and said bottom surface, a second trailing face (64) opposite said second leading face and extending between rearwardly facing edges of said second top surface and said bottom surface, a first end surface (66) extending between outwardly facing edges of said first top surface, bottom surface, first leading face and first trailing face, a second end surface (68) extending between outwardly facing edges of said second top surface, bottom surface, second leading face and second trailing face;

a first end edge (76) defined by the intersection of said first top surface and the first end surface and a second end edge (78) defined by the intersection of the second top surface and said second end surface; and wherein said insert has an orientation angle (33) about 35° to about 45° from said latitudinal plane.

4. A drill bit (20) adapted for use in drilling masonry or other hard, brittle material, which comprises:

an axially elongated, generally cylindrical body (21), aligned on a longitudinal axis (4), having a leading front end portion and a rear end portion, said rear end portion adapted to be held by a tool holder, said body having at least one spiral groove (25) cast in its exterior surface substantially alone its length; and a hard insert (27) embedded in the leading end of said body, extending generally diametrically across said leading end of said body, centered about a latitudinal plane (5) said insert comprising:

a first top surface (52), a second top surface (54), a bottom surface (56) opposite said first and second top surface, a first leading face (58) extending between forwardly facing edges of said first top surface and said bottom surface, a second leading face (60) extending between forwardly facing edges of said second top surface and said bottom surface, a first trailing face (62) opposite said first leading face and extending between rearwardly facing edges of said first top surface and said bottom surface, a second trailing face (64) opposite said second leading face and extending between rearwardly facing edges of said second top surface and said bottom surface, a first end surface (66) extending between outwardly facing edges of said first top surface, bottom surface, first leading face and first trailing face, a second end surface (68) extending between outwardly facing edges of said second top surface, bottom surface, second leading face and second trailing face;

a first end edge (76) defined by the intersection of said first top surface and the first end surface and a second end edge (78) defined by the intersection of the second top surface and said second end surface; and wherein said groove terminates at said insert at said adjoining surface, wherein said insert has an interface angle (34) about 26° to about 36° from said longitudinal axis.

5. A drill bit as recited in claim 2, wherein said insert has an orientation angle (33) about 35° to about 45° from said latitudinal plane.

6. A drill bit as recited in claim 3, wherein said groove terminates at said insert at said adjoining surface, wherein said insert has an interface angle (34) about 26° to about 36° from said longitudinal axis.

7. A drill bit as recited in claim 4, wherein said insert has an orientation angle (33) about 35° to about 45° from said latitudinal plane.

8. A drill bit as recited in claim 2, wherein said groove terminates at said insert at said adjoining surface, wherein said insert has an interface angle (34) about 26° to about 36° from said longitudinal axis.

9. A drill bit as recited in claim 5, wherein said groove terminates at said insert at said adjoining surface, wherein said insert has an interface angle (34) about 26° to about 36° from said longitudinal axis.

10. A drill bit as recited in any one of claims 2, 3 or 4, wherein a chisel edge (70) is defined by the intersection of said first top surface and said second top surface; and which further comprises:

a first cutting edge (72) defined by the intersection of said first top surface and said first leading face and a second cutting edge (74) defined by the intersection of said second top surface and said second leading face.

11. A drill bit as recited in claim 10, wherein said second leading face and said first trailing face are essentially planar surfaces aligned adjacently in a common plane, said first leading face and said second trailing face are essentially planar surfaces aligned adjacently in a common plane, said first end surface is parallel with said second end surface, and each of said first end surface and second end surface forms an acute angle relative to the first and second leading face, respectively.

12. A drill bit as recited in claim 11, having two pairs of said grooves, each said pair adjoining to said trailing face of said insert to provide an escape path for drilling chips, particles, dust, and other debris loosened by said insert during the drilling operation, wherein said each pair comprises at least one narrow groove (1) and at least one wide groove (2).

13. A drill bit as recited in claim 1, wherein said first leading face has a faceangle (32) from about 0° to about 2° between a plane parallel with said first leading face and said longitudinal axis, and said second leading face has a faceangle from about 0° to about 2°, between a plane parallel with said second leading face and said longitudinal axis, said first end edge has a backangle (31) from about 26° to about 28° between a plane parallel to said first end edge and a plane parallel to said bottom surface and said second end edge has a backangle from about 26° to about 28° between a plane parallel to said second end edge and a plane parallel to said bottom surface.

14. A drill bit as recited in claim 13, wherein said faceangle of said first leading face is about 0°, and said faceangle of said second leading face is about 0°.

15. A drill bit as recited in claim 1, wherein said insert has an orientation angle (33), from about 35° to about 45° between a plane, extending from the vertex of said convex line of the wide groove to an intersection point of said longitudinal axis and said chisel edge, to said latitudinal plane.

16. A drill bit as recited in claim 1, wherein said wide groove terminates at said insert at said adjoining surface, wherein said insert has an interface angle (34) from about 26° to about 36°, between a plane parallel to said adjoining surface and said longitudinal axis.

17. A drill bit as recited in claim 16, wherein said insert has an interface angle of about 28°.

18. A drill bit as recited in claim 15, wherein said insert has an orientation angle of about 40°.

* * * * *

UNITED STATES PATENT AND TRADEMARK OFFICE
CERTIFICATE OF CORRECTION

PATENT NO. : 5,893,688
DATED : April 13, 1999
INVENTOR(S) : Wiker et al.

It is certified that error appears in the above-identified patent and that said Letters Patent is hereby corrected as shown below:

Col. 6, l. 62:   Change "ton" (both occurrences) to --top-- (both occurrences)

Col. 6, l. 64:   Change "ton" to --top--

Signed and Sealed this

Twenty-eighth Day of September, 1999

*Attest:*

*Attesting Officer*

Q. TODD DICKINSON

*Acting Commissioner of Patents and Trademarks*